United States Patent
Higuchi et al.

(10) Patent No.: US 7,583,739 B2
(45) Date of Patent: Sep. 1, 2009

(54) CHANNEL ESTIMATION DEVICE, CHANNEL ESTIMATION METHOD, AND WIRELESS RECEIVER

(75) Inventors: Kenichi Higuchi, Yokohama (JP);
Hiroyuki Kawai, Yokosuka (JP);
Noriyuki Maeda, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 452 days.

(21) Appl. No.: 11/128,191

(22) Filed: May 13, 2005

(65) Prior Publication Data
US 2005/0254589 A1    Nov. 17, 2005

(30) Foreign Application Priority Data
May 13, 2004    (JP)    ............... 2004-144183

(51) Int. Cl.
*H04K 1/10*    (2006.01)
(52) U.S. Cl. .................. 375/260; 370/208; 370/329; 370/343; 370/260; 375/147; 375/227; 375/347
(58) Field of Classification Search ............. 342/383; 375/227, 341, 267; 370/208, 335, 344, 210, 370/200
See application file for complete search history.

(56) References Cited
U.S. PATENT DOCUMENTS
2003/0072254 A1 *   4/2003  Ma et al. ............. 370/208

FOREIGN PATENT DOCUMENTS

| | | |
|---|---|---|
| EP | 1 089 451 A1 | 4/2001 |
| EP | 1 276 251 A1 | 1/2003 |
| JP | 2003-338779 | 11/2003 |
| KR | 2001-0083040 | 8/2001 |
| KR | 2002-0095156 | 12/2002 |
| WO | WO 00/60761 | 10/2000 |
| WO | WO 01/15332 A1 | 3/2001 |
| WO | WO 01/73983 A | 10/2001 |

OTHER PUBLICATIONS

Hidehiro Andoh, et al, "Channel Estimation Filter Using Time-Multiplexed Pilot Channel for Coherent RAKE Combining in DS-CDMA Mobile Radio", Ieice Transaction on Comunications Society, Tokyo, Japan, vol. E81-B. No. 7, XP-000790186, Jul 1, 1998, pp. 1517-1525.

* cited by examiner

*Primary Examiner*—David C Payne
*Assistant Examiner*—Adolf Dsouza
(74) *Attorney, Agent, or Firm*—Oblon, Spivak, McClelland, Maier & Neustadt, P.C.

(57) ABSTRACT

A channel estimation device is provided to achieve high-precision channel estimation in a MIMO or multicarrier wireless receiver. This channel estimation device is used in the wireless receiver that receives pilot signals through reception antennas. The pilot signals are modulated by a multicarrier method and are transmitted from transmission antennas. The pilot signals are orthogonal to one another. The channel estimation device includes: an estimation unit that determines a channel estimate value for each unit time slot and each unit sub carrier; and an averaging unit that averages the channel estimate values over time slots including a target time slot and sub carriers including a target sub carrier, thereby determining an average channel estimate value.

8 Claims, 8 Drawing Sheets

CHANNEL ESTIMATE VALUE

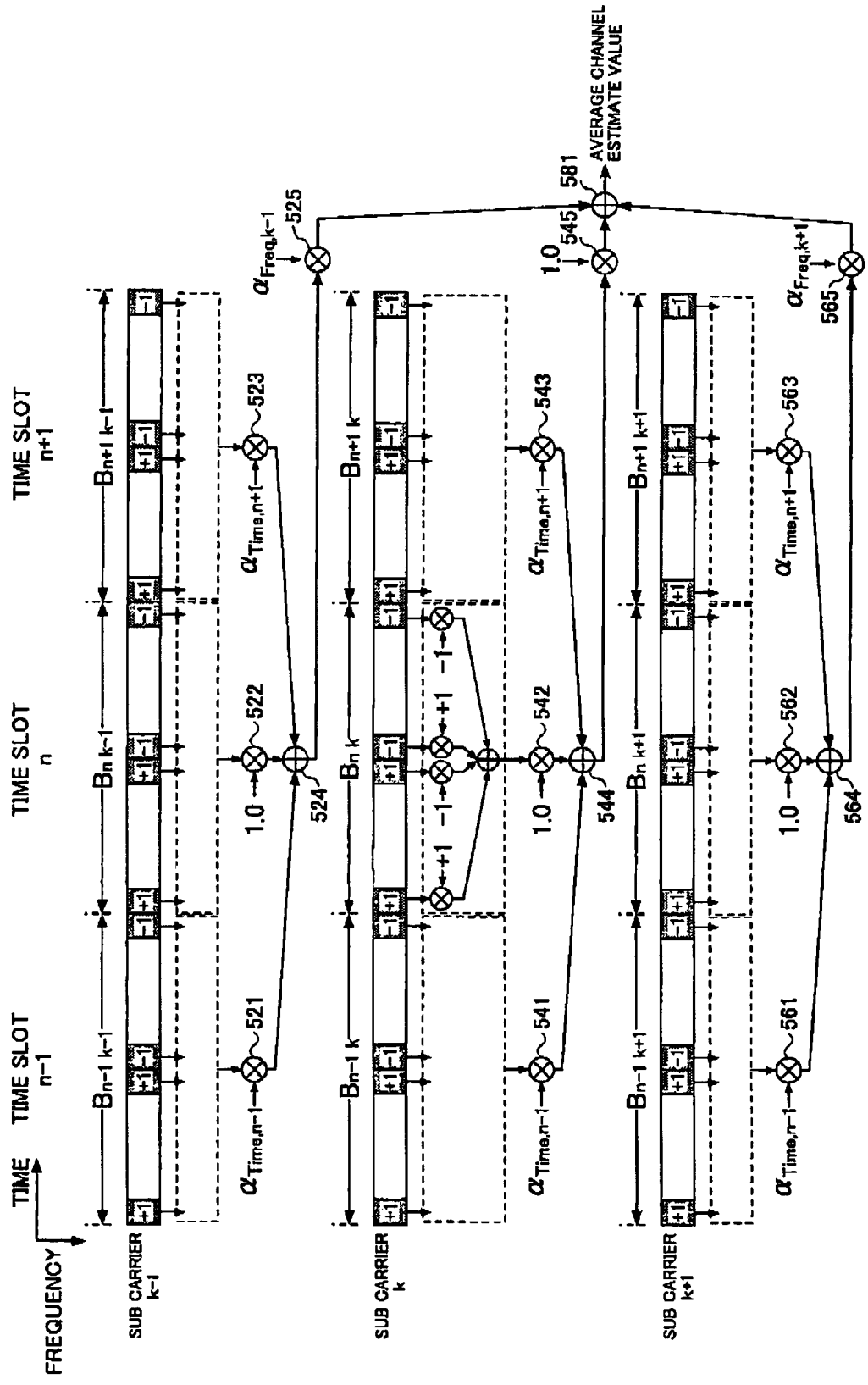

FIG.6

| | $-N^-_{Time}$ | ... | $-1$ | $0$ | $1$ | ... | $N^+_{Time}$ |
|---|---|---|---|---|---|---|---|
| $-N^-_{Freq}$ | $\alpha_{-N^-_{Time},-N^-_{Freq}}$ | ... | $\alpha_{-1,-N^-_{Freq}}$ | $\alpha_{0,-N^-_{Freq}}$ | $\alpha_{1,-N^-_{Freq}}$ | ... | $\alpha_{N^+_{Time},-N^-_{Freq}}$ |
| ... | ... | | ... | ... | ... | | ... |
| $-1$ | $\alpha_{-N^-_{Time},-1}$ | ... | $\alpha_{-1,-1}$ | $\alpha_{0,-1}$ | $\alpha_{1,-1}$ | ... | $\alpha_{N^+_{Time},-1}$ |
| $0$ | $\alpha_{-N^-_{Time},0}$ | ... | $\alpha_{-1,0}$ | $\alpha_{0,0}$ | $\alpha_{1,0}$ | ... | $\alpha_{N^+_{Time},0}$ |
| $1$ | $\alpha_{-N^-_{Time},1}$ | ... | $\alpha_{-1,1}$ | $\alpha_{0,1}$ | $\alpha_{1,1}$ | ... | $\alpha_{N^+_{Time},1}$ |
| ... | | | | | | | |
| $N^+_{Freq}$ | $\alpha_{-N^-_{Time},N^+_{Freq}}$ | ... | $\alpha_{-1,N^+_{Freq}}$ | $\alpha_{0,N^+_{Freq}}$ | $\alpha_{1,N^+_{Freq}}$ | ... | $\alpha_{N^+_{Time},N^+_{Freq}}$ |

SLOT NUMBER (RELATIVE VALUE), n'

SUB CARRIER NUMBER (RELATIVE VALUE), k'

$N^-_{Time}, N^+_{Time}$: NUMBER OF AVERAGED SLOTS $N^-_{Freq}, N^+_{Freq}$: NUMBER OF AVERAGED SUB CARRIERS

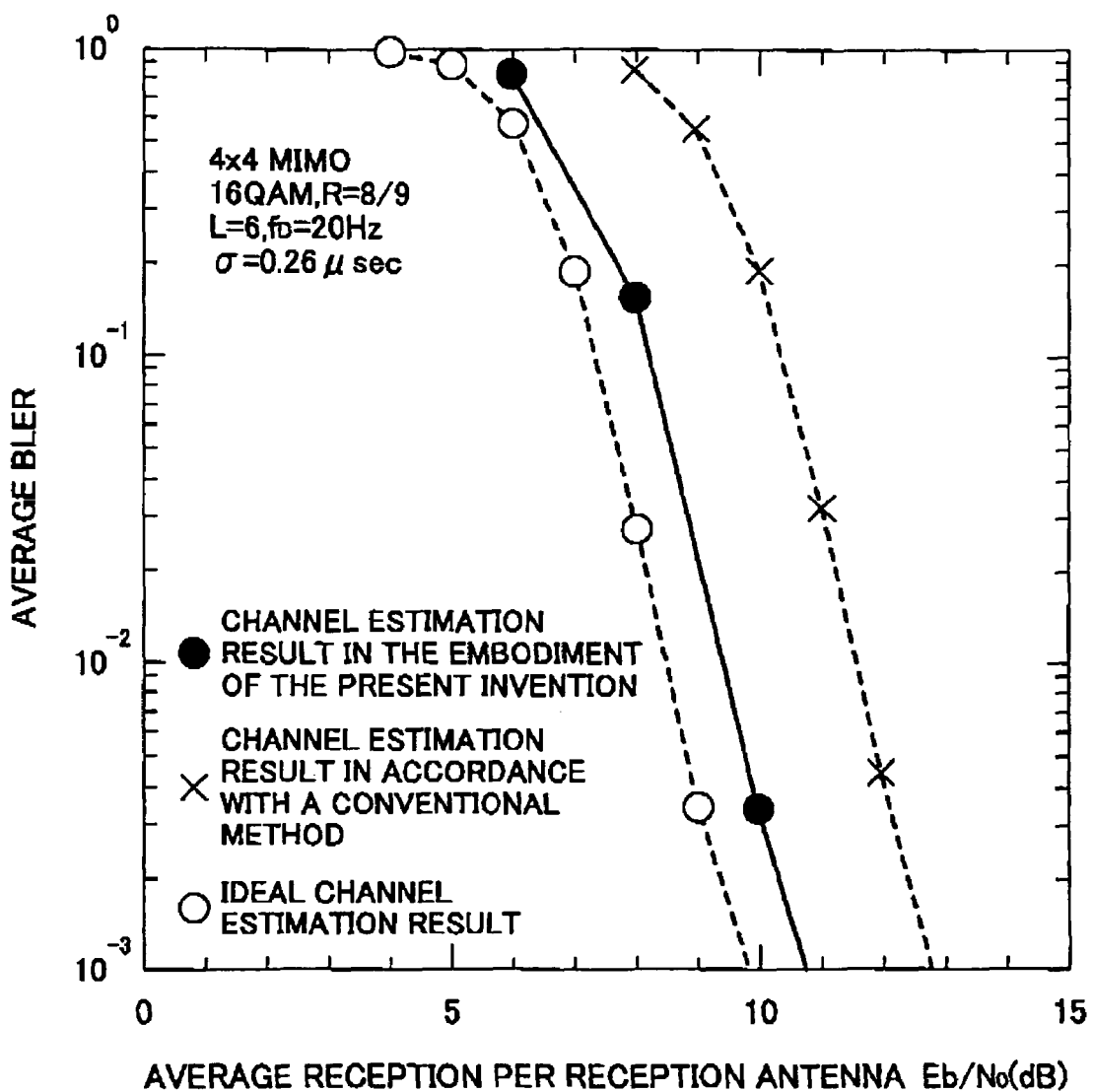

CHANNEL ESTIMATION DEVICE, CHANNEL ESTIMATION METHOD, AND WIRELESS RECEIVER

BACKGROUND OF THE INVENTION

The present invention generally relates to wireless communications by the multi-input multi-output (MIMO) and the multicarrier method, and, more particularly, to a channel estimation device, a channel estimation method, and a wireless receiver that are used in such wireless communications.

In this field of technology, studies are being made so as to realize high-capacity high-speed information communication systems of the present and next generations and later generations. Attention is being drawn to the MIMO method to increase the communication capacity, and to the multicarrier method to reduce the interference in a multipath propagation environment. Particularly, more attention is being drawn to the orthogonal frequency division multiplexing (OFDM) method.

FIG. 1 is a schematic view of a MIMO communication system that includes a transmitter 102 and a receiver 104. As shown in FIG. 1, in accordance with the MIMO method, different signals are simultaneously transmitted from transmission antennas 106-1 through 106-N at the same frequency. These transmission signals are received by reception antennas 108-1 through 108-N. For ease of explanation, the number of transmission antennas and the number of reception antennas are both N in this example. However, the number of transmission antennas may be different from the number of reception antennas.

FIG. 2 is a schematic view of the receiver 104. Reception signals $y_1$ through $y_N$ received by the respective reception antennas 108-1 through 108-N are input to a signal detector 202. The reception signals $y_1$ through $y_N$ are also input to a channel estimation unit 204. Based on reception signals including known pilot signals at both sides of transmission and reception, the channel estimation unit 204 determines a channel impulse response (CIR) value or a channel estimate value, thereby performing channel estimation.

FIG. 3 is a schematic view illustrating the structure and operation of the channel estimation unit 204. In this example illustrated in FIG. 3, pilot signals are time-multiplexed in one frame. Here, the pilot signals are represented as the signal sequence of "+1, +1, −1, −1", and these signals are contained at four locations in the frame, In the frame, the portions other than the pilot signals are equivalent to data signals or the like. As indicated by the broken line in FIG. 3, at multipliers 301 through 304 in the channel estimation unit 204, the pilot signals extracted from the frame are multiplied by the signals held by the channel estimation unit 204. The multiplication results of the respective multipliers 301 through 304 are added up at an adder 305. The output after the adding operation represents the channel estimate value.

Referring back to FIG. 2, the signal detector 202 separates the signals transmitted from the respective transmission antennas 106-1 through 106-N, based on the reception signals supplied from the reception antennas 108-1 through 108-N and the channel estimate value supplied from the channel estimation unit 204. The separated signals are then supplied to a channel decoder to perform further decoding operations.

An example of the conventional channel estimation is disclosed in Japanese Laid-Open Patent Application No. 2003-338779, for example.

By the above described MIMO method, channels (propagation paths) are presumably set between the transmission antennas and the respective reception antennas, and generally have different channel variations. Especially, in the case where the multicarrier method is employed, a channel estimate value needs to be set for each sub carrier. Accordingly, in the case where the MIMO method or the multicarrier method is employed, it is necessary to accurately determine a very large number of channel estimate values. Otherwise, appropriate signal separation will become difficult at the signal detector 202. For example, the number of transmission antennas and the number of reception antennas are both 2, the QPSK modulation method is employed, and eight sub carriers are used. In such a case, there are four types of possible signal points for each one transmission antenna. Therefore, it is necessary to examine 16 combinations of signal points for each of the eight sub carriers at the reception side.

In the conventional channel estimation illustrated in FIGS. 2 and 3, however, the precision in the channel estimation is not necessarily high, and signal separation might not be appropriately performed in some communication environments. As the number of antennas, the number of sub carriers, and the number of signal points in the multivalue modulation increase, this problem becomes more severe.

SUMMARY OF THE INVENTION

A general object of the present invention is to provide channel estimation devices, channel estimation methods, and wireless receivers in which the above disadvantages are eliminated.

A more specific object of the present invention is to provide a channel estimation device, a channel estimation method, and a wireless receiver that can perform channel estimation with high precision in the wireless receiver that employs the MIMO method or the multicarrier method.

The above objects of the present invention are achieved by a channel estimation device that is used in a wireless receiver that receives pilot signals through reception antennas. The pilot signals are modulated by a multicarrier method and are transmitted from transmission antennas. The pilot signals are orthogonal to one another. This channel estimation device includes: an estimation unit that determines a channel estimate value for each unit time slot and each unit sub carrier; and an averaging unit that averages the channel estimate values over time slots including a target time slot and sub carriers including a target sub carrier, thereby determining an average channel estimate value.

In accordance with the present invention, channel estimation can be performed with high precision by averaging channel estimate values.

The above and other objects and features of the present invention will become more apparent from the following description taken in conjunction with the accompanying drawings.

BRIEF DESCRIPTION OF THE DRAWINGS

FIG. 5 schematically illustrates an operation in accordance with the present invention;

FIG. 6 is a table of weighting factors;

FIG. 8 shows the results of a simulation in which the method in accordance with the present invention is compared with a conventional method.

DESCRIPTION OF THE PREFERRED EMBODIMENTS

The following is a description of embodiments of the present invention, with reference to the accompanying drawings.

Figures 1, 2:
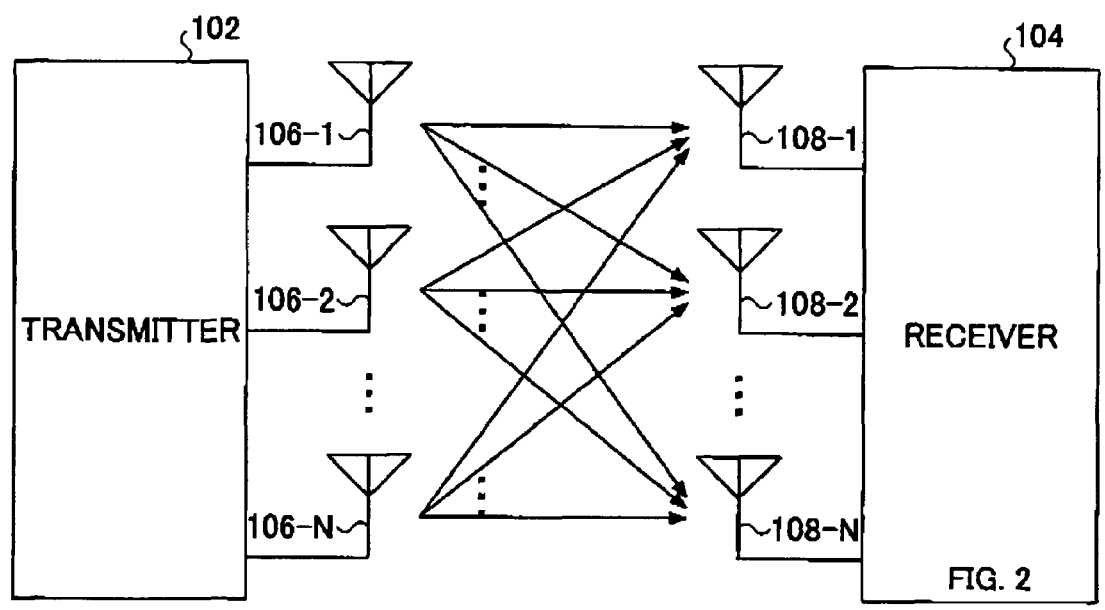
FIG. 1 is a schematic view of a conventional MIMO communication system.
FIG. 2 is a schematic view of a conventional MIMO receiver.
Figure 2:
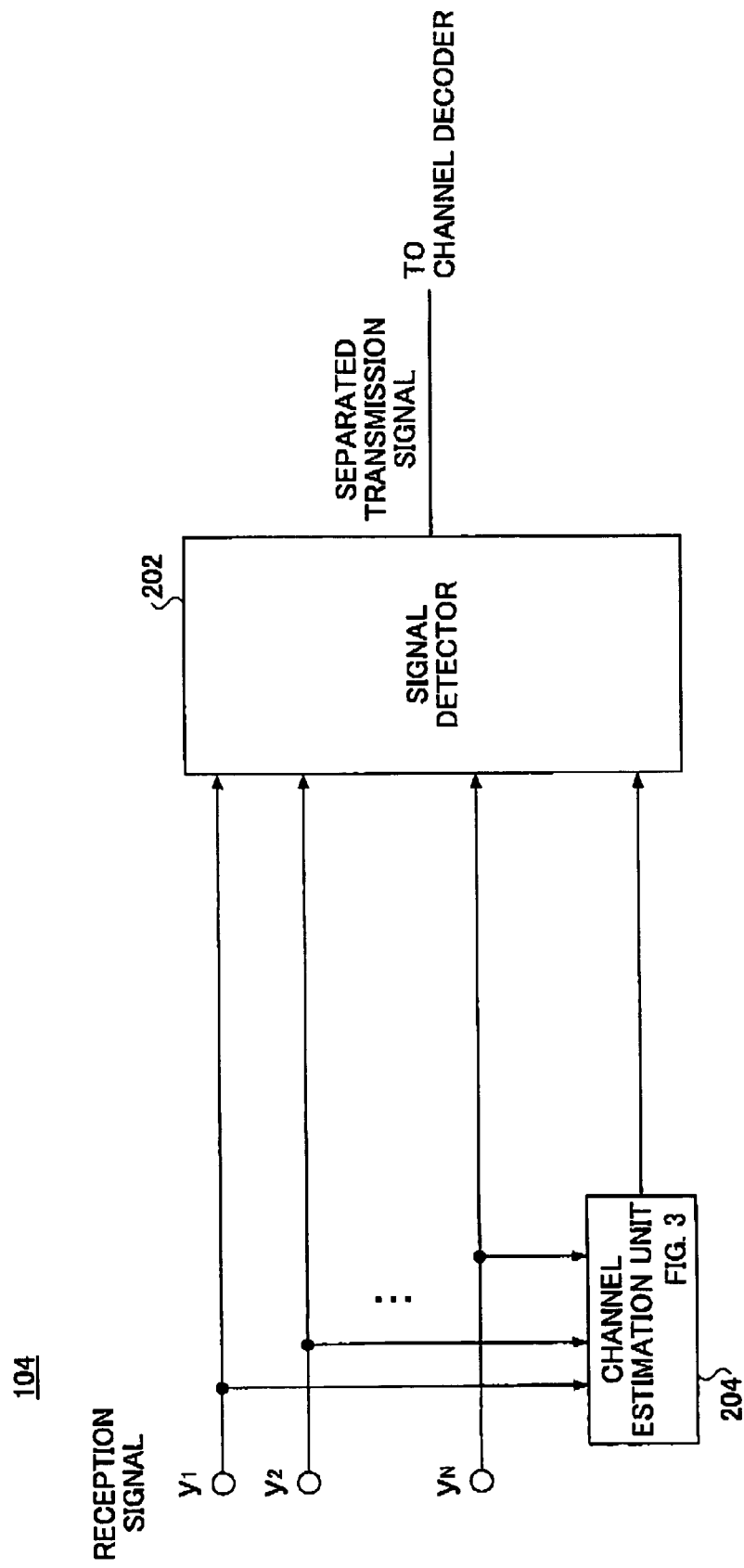

In the following, pilot signals that are modulated by the OFDM method are transmitted from the transmission antennas of a transmitter that is the same as the transmitter illustrated in FIG. 1. The pilot signals are represented by predetermined signal sequences that are orthogonal to one another.

Figure 4:
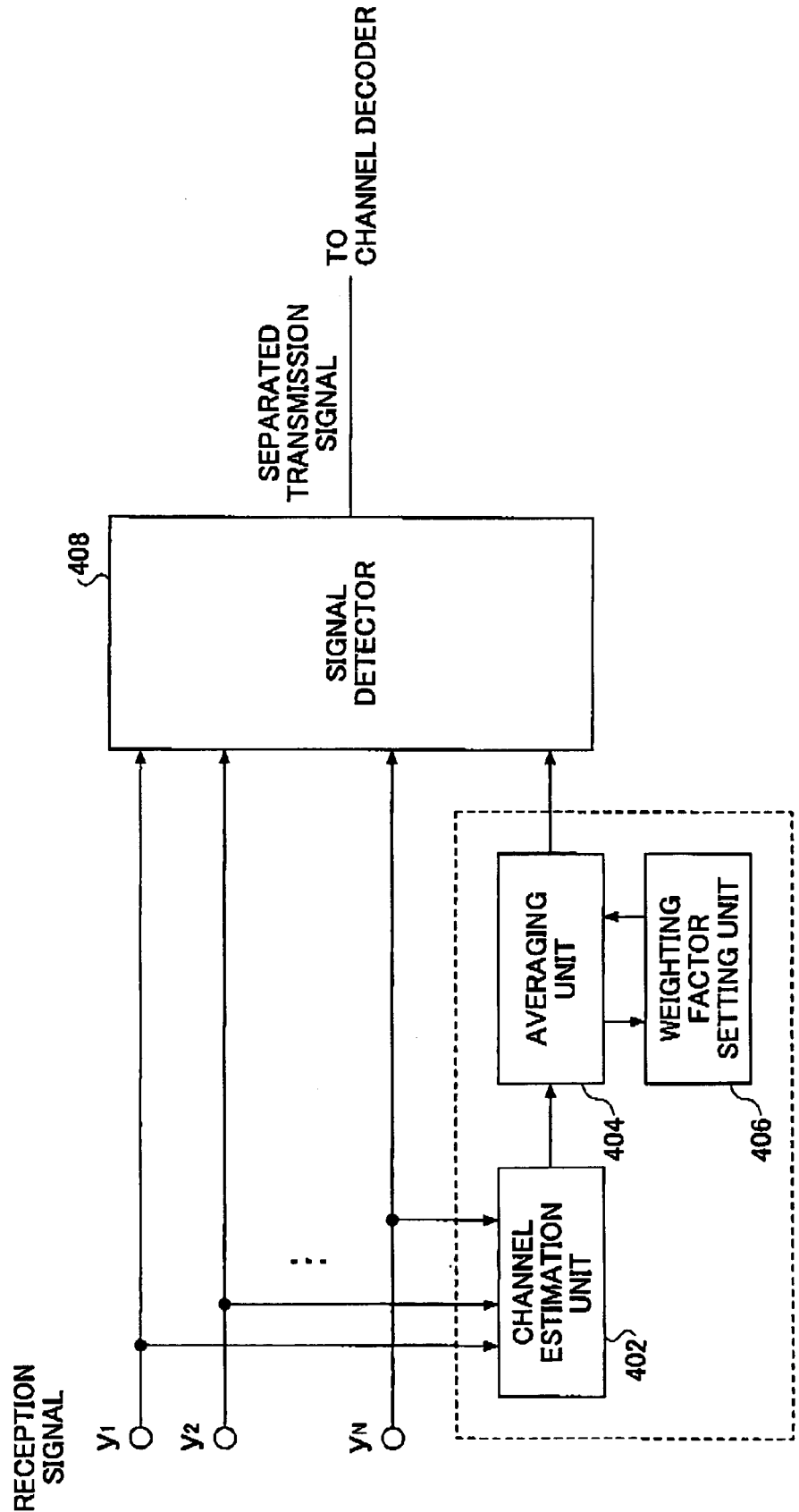
FIG. 4 is a schematic view of a receiver that includes a channel estimation device in accordance with an embodiment of the present invention.

FIG. 4 is a schematic view of a receiver that includes a channel estimation device in accordance with an embodiment of the present invention. This receiver includes a channel estimation unit 402, an averaging unit 404, and a weighting factor setting unit 406. These components located within the dotted-line frame in FIG. 4 constitute the "channel estimation device". In addition to those components, the receiver includes a signal detector 408.

Figure 3:
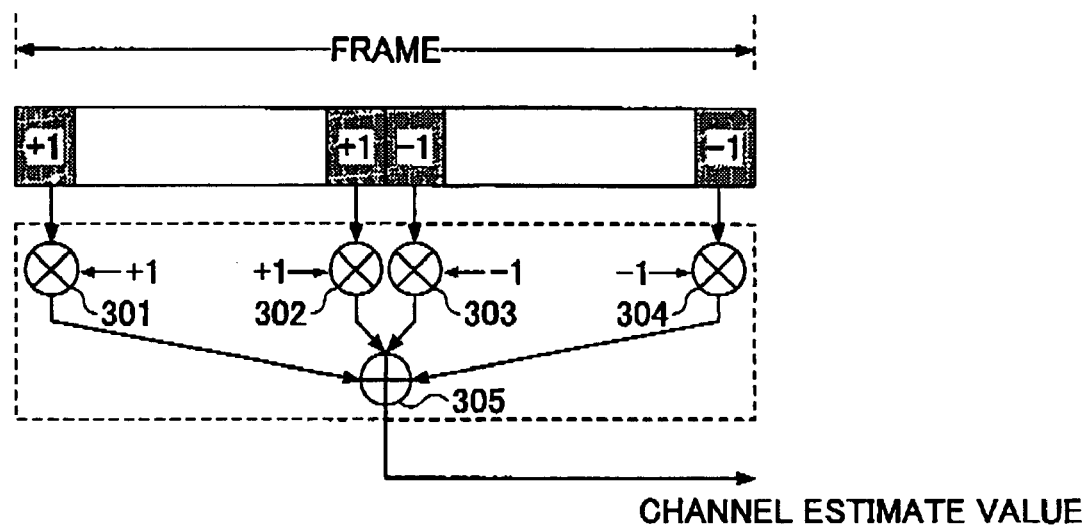
FIG. 3 is a schematic view illustrating the operation of the channel estimation unit.

The channel estimation unit 402 outputs a channel impulse response value or a channel estimate value, based on the signals and pilot signals received at the respective reception antennas. As the OFDM modulation method is employed in this embodiment, a channel estimate value is output for each sub carrier. The structure and operation of the channel estimation unit 402 are the same as those illustrated in FIG. 3, except that the output from the channel estimation unit 402 is not input directly to the signal detector 408 but is input to the averaging unit 404.

The averaging unit 404 weighting-averages channel estimate values. The weighting factor that is used for the weighting is set at the weighting factor setting unit 406. The averaging unit 404 and the weighting factor setting unit 406 are described below in detail.

Based on the reception signal from each reception antenna and the averaged channel estimate value, the signal detector 408 detects and separates the signal transmitted from each transmission antenna. The signal separation may be carried out by the minimum mean square error (MMSE) method, a maximum likelihood decision (MLD), or a QR-modulation type maximum likelihood decision (QRM-MLD), for example. Each separated transmission signal is then supplied to a channel decoder for further demodulation.

FIG. 5 schematically illustrates the operation in accordance with this embodiment. This operation is to be performed by the channel estimation unit 402, the averaging unit 404, and the weighting factor setting unit 406, which constitute the "channel estimation device". In the example illustrated in FIG. 5, to determine an averaged channel estimate value with respect to a certain time slot n and a certain sub carrier k or a block $B_{nk}$, the nine channel estimate values of the block $B_{nk}$ and the neighboring eight blocks are averaged. In the example illustrated in FIG. 5, the number of transmission antennas and the number of reception antennas are both 4, and the pilot signals that are transmitted from the respective transmission antennas and are orthogonal to one another may have the following contents;

Transmission antenna 1: (1, 1, 1, 1)
Transmission antenna 2: (1, −1, 1, −1)
Transmission antenna 3: (1, −1, −1, 1)
Transmission antenna 4: (1, 1, −1, −1)

The contents of the four signals are time-multiplexed with transmission signals and are then transmitted. In FIG. 5, the signal contents transmitted through the transmission antenna 4 are shown as an example. The same operation is of course performed with the other pilot signals, but such operation is omitted for ease of explanation.

Signals $y_1$ through $y_N$ that are received at the respective reception antennas are input to the channel estimation unit 402 shown in FIG. 4, and a channel estimate value is output for each frame or block that is identified with a sub carrier or a time slot. In the case shown in FIG. 5, one channel estimate value is obtained for each of the nine blocks $B_{n-1\ k-1}$ through $B_{n+1\ k+1}$. In FIG. 5, the components to determine the channel estimate value (or the components to determine the sum of the outputs of four multipliers) are shown in the dotted-line frame below the center block $B_{nk}$. However, the equivalent components for the other blocks are not shown for simplification of the drawing.

The channel estimate value calculated with respect to each block is supplied to one of the inputs of each corresponding multiplier, and the corresponding weighting factor is supplied to the other one of the inputs of the corresponding multiplier. For example, the channel estimate value with respect to the block $B_{nk}$ is supplied to one of the inputs of the multiplier 542, and the corresponding weighting factor (1.0 in this example) is supplied to the other one of the inputs of the multiplier 542. The channel estimate values with respect to the same sub carrier k as well as the time slots n−1 and n+1 adjacent to the time slot n are supplied to inputs of the multipliers 541 and 543, respectively, and the corresponding weighting factors $\alpha_{Time,n-1}$ and $\alpha_{Time,n+1}$ are supplied to the other inputs of the multipliers 541 and 543, respectively. The output of each of the multipliers 541, 542, and 543 is supplied to the adder 544, and the output of the adder 544 is supplied to one of the inputs of the multiplier 545. The corresponding weighting factor (1.0 in this example) is supplied to the other one of the inputs of the multiplier 545. The output of the multiplier 545 can be associated with the weighted average value of the channel estimate values with respect to the sub carrier k over the three time slots.

Likewise, the weighted addition value over the three time slots with respect to the sub carrier k−1 that is one of the two sub carriers adjacent to the sub carrier k is supplied to one of the inputs of the multiplier 525, and the weighting factor $\alpha_{Freq,k-1}$ is supplied to the other one of the inputs of the multiplier 525. The output of the multiplier 525 can be associated with the average value of the channel estimate values with respect to the sub carrier k−1 over the three time slots. The weighted addition value over the three time slots with respect to the sub carrier k+1 that is the other one of the two sub carriers adjacent to the sub carrier k is supplied to one of the inputs of the multiplier 565, and the weighting factor $\alpha_{Freq,k+1}$ is supplied to the other one of the inputs of the multiplier 565. The output of the multiplier 565 can be associated with the average value of the channel estimate values with respect to the sub carrier k+1 over the three time slots.

The outputs of the multipliers 525, 545, and 565 are added up by the adder 581. The output of the adder 581 can be associated with the weighted average value of the channel estimate values with respect to the three sub carriers k−1, k, and k+1 over the three time slots n−1, n, and n+1. The operations for weighting-adding and weighting-averaging the channel estimate values are mainly performed at the averaging unit 404 shown in FIG. 4. The averaged channel estimate value that is output from the adder 581 at last is supplied to the signal detector 408. Supplied with the average channel estimate value that is averaged with high precision, the signal detector 408 can perform signal separation with high precision.

The weighting factor that is supplied to each multiplier is set by the weighting factor setting unit 406 shown in FIG. 4. Although the weighting factor to be supplied to the multipliers 522, 542, and 562 is 1.0 in the example shown in FIG. 5, another value may be provided. The preset weighting factor $\alpha_{n,k}$ may be varied with each block designated by a time slot n and a sub carrier k. However, to reduce the storage amount and operational workload, it is possible to set the same value for two or more blocks. For example, the weighting factors $\alpha_{n-1,k}$ and an $\alpha_{n+1,k}$ with respect to the time slots adjacent to a time slot n may be the same (so are in the sub carrier direction).

The weighting factors may be fixed values that can be used over a long period of time, or may be varied depending on the communication condition. In the latter case, each weighting factor may be divided into a time component and a frequency component, so as to cope with the channel variations both in the time domain and the frequency domain. For example, weighting factors can be expressed as $\alpha_{n,k} = \alpha_{Freq,k} \times \alpha_{Time,n}$. In such a case, the weighting factors can reflect the influence of channel variations in the frequency domain and the influence of channel variations in the time domain separately from each other. Alternatively, by employing another technique for expressing weighting factors, it is possible to associate channel variations in the frequency domain with the corresponding channel variations in the time domain. The time component $\alpha_{Time,n}$ of a weighting factor can be set depending on the maximum Doppler frequency, for example. The frequency component $\alpha_{Freq,k}$ can be set depending on the estimated value of delay spread, for example.

In the example illustrated in FIG. 5, the channel estimate value of the adjacent eight blocks are used to average the channel estimate values with respect the block $B_{nk}$. However, the present invention is not limited to the above embodiment. The number of channel estimate values to be used in the averaging process can be arbitrarily set by setting an appropriate weighting factor. In a regular usage environment such as a low-speed mobile communication terminal, for example, channel variations in the time domain are smaller than channel variations in the frequency domain. Therefore, the averaging of the channel estimate values in the time domain is performed first, or the number of average values in the time domain is made greater than that in the frequency domain.

As shown in FIG. 5, in the above described embodiment, the averaging process in the frequency domain is performed after the averaging process in the time domain. However, the averaging process in the time domain may be performed after the averaging process in the frequency domain.

FIG. 6 shows a table of general weighting factors. The number of time slots to be used in an averaging process is $N^-_{Time} + N^+_{Time} + 1$. The number of sub carriers to be used in an averaging process is $N^-_{Freq} + N^+_{Freq} + 1$. Accordingly, to average the channel estimate values with respect to the block $B_{nk}$ (having a weighting factor $\alpha_{00}$), a weighting averaging process is carried out on $(N^-_{Time} + N^+_{Time} + 1) \times (N^-_{Freq} + N^+_{Freq} + 1)$ of channel estimate values. The averaging process using those weighting factors is carried out in accordance with the following equation:

$$\xi'(n) = \frac{\sum_{k'=-N^-_{Freq}}^{N^+_{Freq}} \sum_{n'=-N^-_{Time}}^{N^+_{Time}} \alpha_{n',k'} \xi_{k+k'}(n+n')}{\sum_{k'=-N^-_{Freq}}^{N^+_{Freq}} \sum_{n'=-N^-_{Time}}^{N^+_{Time}} \alpha_{n',k'}}$$

(Equation 1)

where $\xi_k'$ represents the averaged channel estimate value with respect to a time slot n and a sub carrier k, and $\xi_k(n)$ represents a non-averaged channel estimate value with respect to the time slot n and the sub carrier k. In the example shown in FIG. 5, $N^-_{Time}$ and $N^+_{Time}$ are both 1, and $N^-_{Freq}$ and $N^+_{Freq}$ are both 1.

In the process of averaging the channel estimate values with respect to the block $B_{nk}$, if the sub carriers are located far apart from one another, the averaging becomes insignificant to high-precision signal separation. This is because the channel variation in the frequency axial direction becomes greater as the sub carriers are located apart from the object on which the averaging is to be performed. Taking this fact into consideration, each weighting factor is set to such a value as to be smaller where the corresponding sub carrier is located far apart from the averaging object. Likewise, in the time axial direction, each weighting factor is also set to such a value as to be smaller where the corresponding sub carrier is located far apart from the averaging object.

Figure 7:
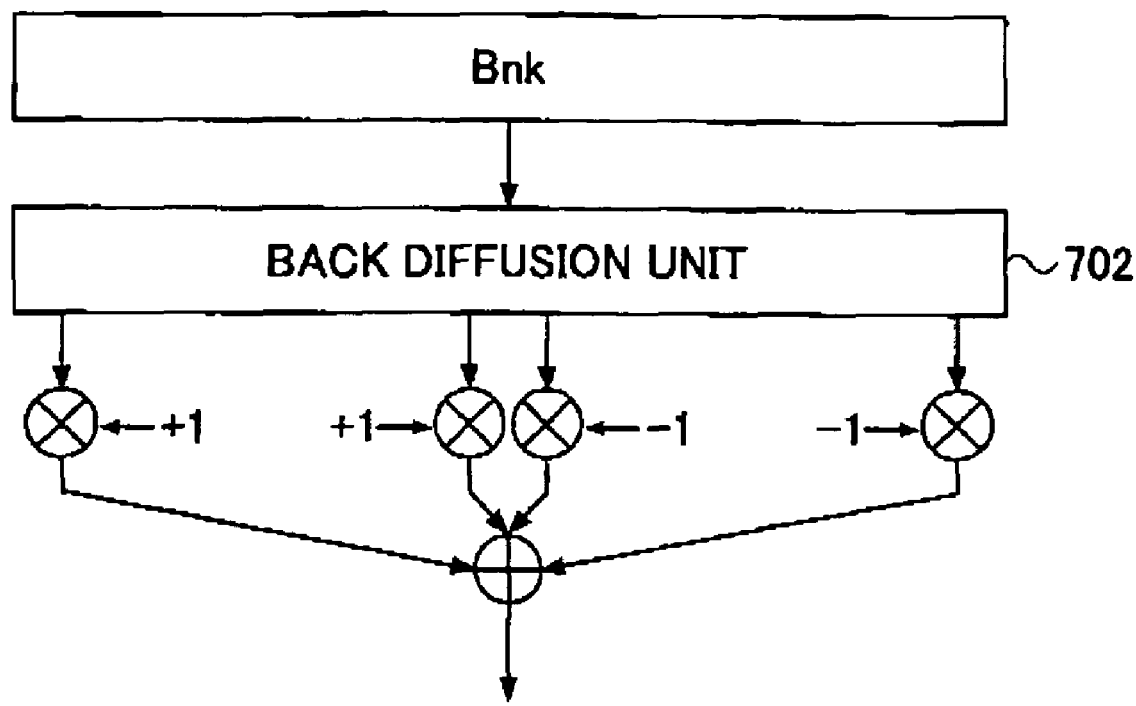
FIG. 7 illustrates a modification of the channel estimation unit in accordance with the present invention.

FIG. 7 illustrates a modification of the channel estimation unit 402. In this modification, pilot signals are not time-multiplexed with transmission signals, but are code-multiplexed with transmission signals. In such a case, reception signals are back-diffused at the back diffusion unit 702, so as to extract the contents (1, 1, −1, 1) of pilot signals. After that, the same procedures as described above are carried out to calculate the amount represented by channel estimate values.

FIG. 8 shows the results of a simulation in which the method in accordance with the present invention is compared with a conventional method. The simulation was carried out under the following conditions:

Number N of transmission and reception antennas: 4
Modulation Type: 16 QAM
Turbo encoding rate R: 8/9
Estimate number L of multipaths: 6
Maximum Doppler frequency fd: 20 Hz
Delay spread σ: 0.26 µs
Information rate: 1 Gbps
Number of blocks used for averaging:
$N^-_{Time} = N^+_{Time} = N^-_{Freq} = N^+_{Freq} = 1$
Weighting factor:
$\alpha_{00} = 1.0$, $\alpha_{Time,1} = 1.0$, $\alpha_{Freq,1} = 0.2$ In FIG. 8, the abscissa indicates the average signal-to-noise density rate (Eb/N$_0$) per 1 information bit, and the ordinate indicates the average block error rate (BLER). In the graph, ○ indicates the ideal estimation results, ● indicates the estimation results of an operation in accordance with the present invention, and X indicates the estimation results of an operation in accordance with the prior art. The estimation results in accordance with the present invention and the prior art are shown as curves that are substantially parallel to the ideal curve. However, the estimation results in accordance with the present invention show an improvement of approximately 2 dB, compared with the results of the prior art.

It should be noted that the present invention is not limited to the embodiments specifically disclosed above, but other variations and modifications may be made without departing from the scope of the present invention.

This patent application is based on Japanese Priority Patent Application No. 2004-144183, filed on May 13, 2004, the entire contents of which are hereby incorporated by reference.

What is claimed is:

1. A channel estimation device that is used in a wireless receiver that receives a plurality of pilot signals through a plurality of reception antennas, the pilot signals being modulated by a multicarrier method and being transmitted from a plurality of transmission antennas, the pilot signals being orthogonal to one another, the channel estimation device comprising:

an estimation unit that determines a channel estimate value for each unit time slot and each unit sub carrier; and an averaging unit that averages the channel estimate values over a plurality of time slots including a target time slot and a plurality of sub carriers including a target sub carrier, thereby determining an average channel estimate value, wherein the weighting factor of each of the channel estimate values to be averaged is represented by the product of a frequency component that varies with a channel variation in the frequency domain and a time component that varies with a channel variation in the time domain.

2. The channel estimation device as claimed in claim 1, wherein a weighting factor of the channel estimate value with respect to the target time slot and the target sub carrier is set equal to or greater than the weighting factor of the channel estimate value with respect to another time slot or another sub carrier.

3. The channel estimation device as claimed in claim 1, further comprising:

an adjusting unit that adjusts the weighting factor of each of the channel estimate values to be averaged, depending on a channel variation in the frequency domain or the time domain.

4. The channel estimation device as claimed in claim 1, wherein the pilot signals that are orthogonal to one another are time-multiplexed with signals transmitted from the transmission antennas.

5. The channel estimation device as claimed in claim 1, wherein the pilot signals that are orthogonal to one another are code-multiplexed with signals transmitted from the transmission antennas.

6. The channel estimation device as claimed in claim 1, wherein the pilot signals that are orthogonal to one another are frequency-multiplexed with signals transmitted from the transmission antennas.

7. A wireless receiver that receives a plurality of pilot signals through a plurality of reception antennas, the pilot signals being modulated by a multicarrier method and being transmitted from a plurality of transmission antennas, the pilot signals being orthogonal to one another, and a channel estimation device that is used in the wireless receiver, the channel estimation device comprising:

an estimatio unit that determines a channel estimate value for each unit time slot and each unit sub carrier; and an averaging unit that averages the channel estimate values over a plurality of time slots including a target time slot and a plurality of sub carriers including a target sub carrier, thereby determining an average channel estimate value, wherein the weighting factor of each of the channel estimate values to be averaged is represented by the product of a frequency component that varies with a channel variation in the frequency domain and a time component that varies with a channel variation in the time domain.

8. A channel estimation method comprising the steps of:

transmitting a plurality of pilot signals through a plurality of transmission antennas, the pilot signals being modulated by a multicarrier method and being orthogonal to one another;

receiving the transmitted pilot signals with a plurality of reception antennas;

determining a channel estimate value for each unit time slot and each unit sub carrier, based on reception signals; and determining an average channel estimate value by averaging channel estimate values over a plurality of time slots including a target time slot and a plurality of sub carriers including a target sub carrier, wherein the weighting factor of each of the channel estimate values to be averaged is represented by the product of a frequency component that varies with a channel variation in the frequency domain and a time component that varies with a channel variation in the time domain.

* * * * *